United States Patent
Feldmann

(10) Patent No.: US 11,156,115 B2
(45) Date of Patent: Oct. 26, 2021

(54) GUIDE VANE ARRANGEMENT FOR TURBOMACHINE

(71) Applicant: MTU Aero Engines AG, München (DE)

(72) Inventor: Manfred Feldmann, Eichenau (DE)

(73) Assignee: MTU Aero Engines AG, Munich (DE)

( * ) Notice: Subject to any disclaimer, the term of this patent is extended or adjusted under 35 U.S.C. 154(b) by 39 days.

(21) Appl. No.: 16/454,520

(22) Filed: Jun. 27, 2019

(65) Prior Publication Data

US 2020/0003065 A1    Jan. 2, 2020

(30) Foreign Application Priority Data

Jun. 28, 2018 (DE) ............... 10 2018 210 597.9

(51) Int. Cl.
*F01D 9/04* (2006.01)

(52) U.S. Cl.
CPC .................. *F01D 9/042* (2013.01)

(58) Field of Classification Search
CPC ..... F01D 9/042; F01D 25/246; F05D 2260/36
See application file for complete search history.

(56) References Cited

U.S. PATENT DOCUMENTS

| | | | |
|---|---|---|---|
| 6,412,149 B1 | 7/2002 | Overberg | |
| 6,575,697 B1 | 6/2003 | Arilla et al. | |
| 7,407,368 B2 * | 8/2008 | Tanaka | F01D 25/145 415/173.1 |
| 7,452,183 B2 * | 11/2008 | Ruthemeyer | F01D 11/005 415/135 |
| 8,118,547 B1 | 2/2012 | Liang | |
| 2002/0048512 A1 | 4/2002 | Cot et al. | |
| 2010/0310360 A1 | 12/2010 | Speed et al. | |
| 2011/0056055 A1 | 3/2011 | Gendraud et al. | |
| 2016/0290168 A1 | 10/2016 | Karafillis et al. | |

FOREIGN PATENT DOCUMENTS

| | | |
|---|---|---|
| EP | 3147457 A1 | 3/2017 |
| FR | 2887920 A1 | 1/2007 |

* cited by examiner

*Primary Examiner* — Michael L Sehn
(74) *Attorney, Agent, or Firm* — Barlow Joseph and Holmes Ltd; David Josephs

(57) ABSTRACT

The present invention relates to a guide vane arrangement for a turbomachine, comprising a guide vane segment and a housing part that are fastened to one another, for which a back guide vane hook that rises radially toward the outside from an outer shroud of the guide vane segment, when referred to a longitudinal axis of the turbomachine, and a housing hook, which is arranged radially inside circumferentially at the housing part, engage in one another in form-fitting manner, wherein, in a first peripheral segment of the guide vane arrangement the guide vane hook has a front wall and a back wall, and therewith forms a groove open radially toward the outside, in which a ring section of the housing hook is arranged and held axially.

12 Claims, 4 Drawing Sheets

GUIDE VANE ARRANGEMENT FOR TURBOMACHINE

BACKGROUND OF THE INVENTION

Technical Field

The present invention relates to a guide vane arrangement for a turbomachine, comprising a guide vane segment and a housing part.

Prior Art

The turbomachine may involve, for example a jet engine, e.g., a turbofan engine. Functionally, the turbomachine is divided into compressor, combustion chamber, and turbine. Roughly speaking, in the case of the jet engine, aspirated air is compressed by the compressor and burned in the downstream combustion chamber with kerosene mixed in. The hot gas that arises, a mixture of combustion gas and air, flows through the downstream turbine and is thereby expanded. The turbine is typically subdivided into a plurality of modules; thus, for example, it may comprise a high-pressure turbine module and a low-pressure turbine module. Each of the turbine modules then usually comprises a plurality of stages, whereby each stage is built up of a guide vane ring and a rotating blade ring that follows downstream. The guide vane arrangement that is discussed here comprises, on the one hand, a guide vane segment, which is part of a corresponding guide vane ring in the module, and, on the other hand, a housing part radially outside thereof, to which the guide vane segment is fastened.

SUMMARY OF THE INVENTION

The present invention is based on the technical problem of providing a particularly advantageous guide vane arrangement.

This is achieved according to the invention with a guide vane arrangement and a particularly advantageous embodiment of the form-fitting connection between guide vane segment and housing part in accordance with the present invention. For the description thereof, reference is made to various peripheral segments relative to a circumference around the longitudinal axis of the turbomachine (see below in detail). In detail, the present subject relates to the form-fit between a back guide vane hook which is raised radially toward the outside from the outer shroud of the guide vane segment, and a radially inner housing hook arranged on the housing part.

A first special feature now lies in the fact that the guide vane hook has an axially front wall and an axial back wall in a first peripheral segment, these walls together forming a radially outer open groove. A ring segment of the housing hook is arranged in this groove, with which the guide vane segment and the housing part are fixed in position in the axial direction. In contrast to an alternatively conceivable solution approach, namely the provision of a separate securing ring (for example, which would engage in a recess in the housing part; see below in detail), the approach according to the invention may already be advantageous due to the smaller number of individual parts. The axial fixation results integrally from the shape of the back guide vane hook itself, which forms a U-shaped uptake with the groove (in the first peripheral segment), when observed in an axial section.

Another special feature lies in the fact that this U-shape is not drawn extensively over the circumference, but rather the back wall is interrupted in a second peripheral segment. The housing hook engages in this discontinuity of the back wall of the guide vane hook, and, in fact, by a cam projecting axially toward the back at the ring section. Therefore, by shaping the hook integrally in turn, thus without a separate securing pin or the like, a peripheral securing of the housing part is created. The integral construction can be of advantage not only due to the reduced number of individual parts, but also, for example, for reasons of sealing. A separately inserted securing pin would require, for example, a slot arrangement, which could also promote thermally induced damage in the long run. Further, the cam projecting axially toward the back, for example, can also be of advantage in this regard, since it is visible toward the back when the module is assembled, typically from front to back, and thus an optical monitoring is accessible (for example, unlike a form-fitting element arranged on the front side).

Preferred embodiments are found in the dependent claims and the entire description, wherein the presentation of the features does not always distinguish individually between device, method, and use aspects; in any case, the disclosure is to be read implicitly with respect to all claim categories. In particular, it thus always relates to both the guide vane arrangement as well as to a turbine module having such an arrangement or to corresponding uses.

In general, in the scope of this disclosure, "axial" refers to the longitudinal axis of the turbine module, thus, consequently, the longitudinal axis of the turbomachine, which coincides, for example, with the axis of rotation of the rotors. "Radial" relates to the radial directions pointing away therefrom and perpendicular thereto, and a "circumference" or "circumferentially" or the "circumferential direction" relates to the rotation around the longitudinal axis (without distinguishing whether it is left or right rotation). "Front" and "back" refer in each case to that axial direction in which the pressure decreases; "front" is thus the higher-pressure side and "back" is the lower pressure side. In the case of the compressor, the pressure increases in the flow direction of the compressor gas, and thus it decreases in the opposite direction, so that the compressor gas passes "back" parts before "front" parts. In the preferred case of the turbine, the pressure decreases in the flow direction; the hot gas thus axially passes "front" parts before "back" parts ("front" then also means upstream and "back" means downstream).

In the scope of this disclosure, "a" and "one", unless expressly indicated otherwise, are to be read as the indefinite article and thus also are always to be read as "at least one". Thus, for example, the guide vane segment as a so-called multi-segment may also have a plurality of guide vanes; on the other hand, however, guide vane segments with a single guide vane in each case are also possible.

The advantages of the integral axial securing when compared to a separate securing ring have already been discussed in the preceding. Such a separate ring as an element inserted into the housing part itself would also be a disadvantage with respect to the thermal or thermomechanical stressing of the guide vane hook. That is, the radial separating surface between guide vane hook and housing would also be set correspondingly wide radially toward the outside; thus, the radial temperature gradient between outer shroud and housing would result essentially exclusively over the guide vane hook, which means a correspondingly large stress on the hook and may be a cause for failure. With the arrangement of the housing hook projecting radially toward the inside according to the invention, the radial separating surface between guide vane hook and housing hook, in contrast, can be freely placed. In particular, an arrangement is possible such that the temperature gradient is distributed on the guide vane hook, on the one hand, and the housing hook, on the other hand.

Once more with respect to the shaping of guide vane hook and housing hook: the guide vane hook forms a U-shape in the first peripheral segment; this shape is then interrupted in the second peripheral segment, where the shape is thus present as an L-shape, for example. In general, the back wall, i.e., the back leg of the U-Shape, could also be shortened, e.g., only radially, in the region of the discontinuity (therefore, it is not completely removed), by which, nevertheless, an engagement of the housing hook secured in the circumferential or peripheral direction would be possible. Preferably, however, an L-shape is present in the second peripheral segment, which (like the U-shape) refers to an axial section, thus to a sectional plane that contains the longitudinal axis.

In preferred embodiment, the ring section of the guide vane hook is then held axially in a third peripheral segment, again between the front wall and the back wall of the guide vane hook. The cam of the housing hook that projects axially toward the back is also secured in two peripheral directions in this way. The first, second, and third peripheral segments follow one another in the sequence named in one of the peripheral or circumferential directions (it does not matter whether it is left or right) (which preferably also applies to a fourth or fifth peripheral segment).

In preferred embodiment, the back wall is provided with another discontinuity, and, in fact, in a fourth peripheral segment (which follows the third). The back wall is thus provided only in the first and the third peripheral segment (and optionally in a fourth); therefore, in other words, it is limited to comparatively small regions in the circumferential direction. Overall, the back wall can be formed locally then with the limitation to the regions in question, so to speak, in nose or cam shapes. This can be of advantage, e.g. insofar as the risk of thermally caused damage in fact can be reduced in this way. This reduction relates to an approximately axial temperature gradient that is not reduced by this measure in itself (preferably, a securing element with a sealing section is provided for this purpose; see below), but which may act there, figuratively speaking, on less material, so that the thermally induced built-up forces are smaller.

This advantage of the additional discontinuity is also expressed by the fact that, preferably, no additional cam of the housing hook is arranged in the additional discontinuity. Unlike the discontinuity in the second peripheral segment, which creates the peripheral securing, the reason for the additional discontinuity is the reduction of thermally induced stresses and also a reduction in weight. Referred to an extension of the outer shroud of the guide vane segment taken in the circumferential direction, the fourth peripheral segment (containing the additional discontinuity) can extend, for example, over a clearly greater percentage than the other peripheral segments; for example, it can extend over at least 30%, 40% or 50% of the extension of the outer shroud (possible upper limits can lie, e.g., at most at 80% or 70%).

In one preferred embodiment, then in a fifth peripheral segment, which follows the fourth segment and therefore the additional discontinuity, a groove is formed in turn that opens radially toward the outside. Observed in an axial section, the guide vane hook in the fifth peripheral segment thus forms in turn a U-shape, in which the ring section of the housing hook is held axially.

In preferred embodiment, the first and the fifth peripheral segments in each case bound one end of the outer shroud on the circumferential side (the ends lie opposite one another in the circumferential direction). This may also be of advantage, for example, insofar as the guide vane segment (assembled with circumferentially adjacent guide vane segments) is secured therewith against any rotation around a vertical axis.

Although the back wall is preferably interrupted many times, the front wall of the guide vane hook is provided without any discontinuity in the preferred embodiment. Thus, it extends continually between the ends of the guide vane hook on the circumferential side that are opposite each other, i.e., it extends without discontinuity. Therefore, the corresponding contact surface between the ring section of the housing hook and the front wall of the guide vane hook is also without a discontinuity, which is of advantage, e.g., with respect to tightness or sealing. Said contact surface generally has an "axial" fraction that holds the guide vane segment toward the back against any axial displacement (the corresponding contact surface typically has a radial extension when observed in the axial section). Further, there is a "radial" fraction (contact at the base of the groove). Since comparatively large forces act on the guide vane segment "toward the back", the discontinuity-free contact is also of advantage from a mechanical viewpoint.

In preferred embodiment, there is an additional securing element, which surrounds the guide vane hook and the housing hook, at least in segments. For this purpose, the securing element forms a U-shape that is open toward the front (when viewed in axial section) and is shifted from behind onto the assembled hook. Preferably, the securing element is a shroud segment. With the U-shape facing the front, it holds the hooks together with respect to the radial direction, in particular in the unstressed state (when the guide vane segment is not pressed radially toward the outside, due to the operating pressure).

In preferred embodiment, the housing hook forms an L-shape with the ring section, when observed in an axial section, and, in fact, not only with the cam in the second peripheral segment, but also (already) with the ring section in the first peripheral segment (with one leg shorter there in comparison). Therefore, an L-shape is also formed where the ring section is held axially between front and back walls. In this case, the lying-down leg of the L-shape points toward the back and is enclosed radially toward the outside by the securing element.

In one preferred embodiment, the securing element has a sealing section that is applied to an outer wall surface of the outer shroud pointing radially toward the outside. When observed in axial section, this sealing section extends from the U-shape away axially toward the back, thus opposite to the legs of the U-shape, so to speak. In this case, the sealing section is ideally attached to the radially inner leg of the U-shape, which creates a good shielding of the connection region lying radially outside, between the housing hook and the guide vane hook. Therefore, in particular, the U-shaped region and also the interrupted region toward the hot-gas channel can be shielded, which can help reduce temperature gradients. As long as an advantageous interaction results with the above-described measures (reduction of the quantity of material on which temperature gradients act), the remaining stresses, in total, can be brought to a non-critical level.

Preferably, the securing element forms a gas channel boundary that radially bounds the rotating blades, which are arranged axially adjacent to the guide vane segment. In this case, the securing element can also have an inlet lining, for example, in the form of a honeycomb seal, for the rotating blades. In this way, with advantageously few and easily assembled parts, guide vanes can be fastened to the housing, and simultaneously, a flush and tightly connecting gas channel boundary or inner wall structure can be provided in the axial region of the following rotating blades.

The securing element with integral sealing section is also of advantage with respect to the integration of different functions (axial securing and radial fixation), which can help reduce the number of individual parts. In general, the securing element can also be a milled part; for example, preferably, it is stamped or bent from sheet metal.

In preferred embodiment, the sealing section is applied in a region of the outer wall surface of the outer shroud that bounds the back edge thereof. The sealing site is thus pulled axially toward the back as far as possible, which can be of advantage also with respect to the shielding.

In one preferred embodiment, the securing element has a cam that projects axially toward the front and that is arranged together with the cam of the housing hook in the discontinuity of the back wall of the guide vane hook. The two cams thus are placed radially on one another; preferably, the cam of the securing element lies radially inside and the cam of the housing part lies radially outside. Therefore, the securing element is secured in the peripheral direction with the same discontinuity that also serves for the peripheral securing of the housing part. Also, in this regard, a separate securing pin or the like is not necessary.

Overall, the securing element can form with its different sections (U-shape with sealing section and optionally an additional leg) an uptake open radially toward the outside, in which an insulating or damping material can be inserted. The subject according to the invention also opens up additional possibilities; that is, for example, a heat shield can be arranged radially in front of the hook between outer shroud and housing part (which is known in and of itself, however). Such a heat shield can be mounted at the housing hook, for example.

The invention also relates to a turbine module having a presently disclosed guide vane arrangement. In this case, a plurality of correspondingly configured guide vane arrangements following one another circumferentially can be provided in a respective guide vane ring. In this case, in particular, a configuration is also possible to the effect that gaps are covered with a peripheral offset. For example, the securing element with the U-shape can be extended over the connection site between two outer shrouds.

The invention further relates also to the use of such a turbine module or a presently disclosed guide vane arrangement in a turbomachine, especially in a jet engine, for example, a turbofan engine.

BRIEF DESCRIPTION OF THE DRAWING FIGURES

In the following, the invention will be explained more closely on the basis of an exemplary embodiment, wherein the individual features in the scope of the independent or coordinated claims can also be essential to the invention in another combination, and wherein also no distinction is made individually between the different claim categories.

Taken individually,

DESCRIPTION OF THE INVENTION

Figure 1:
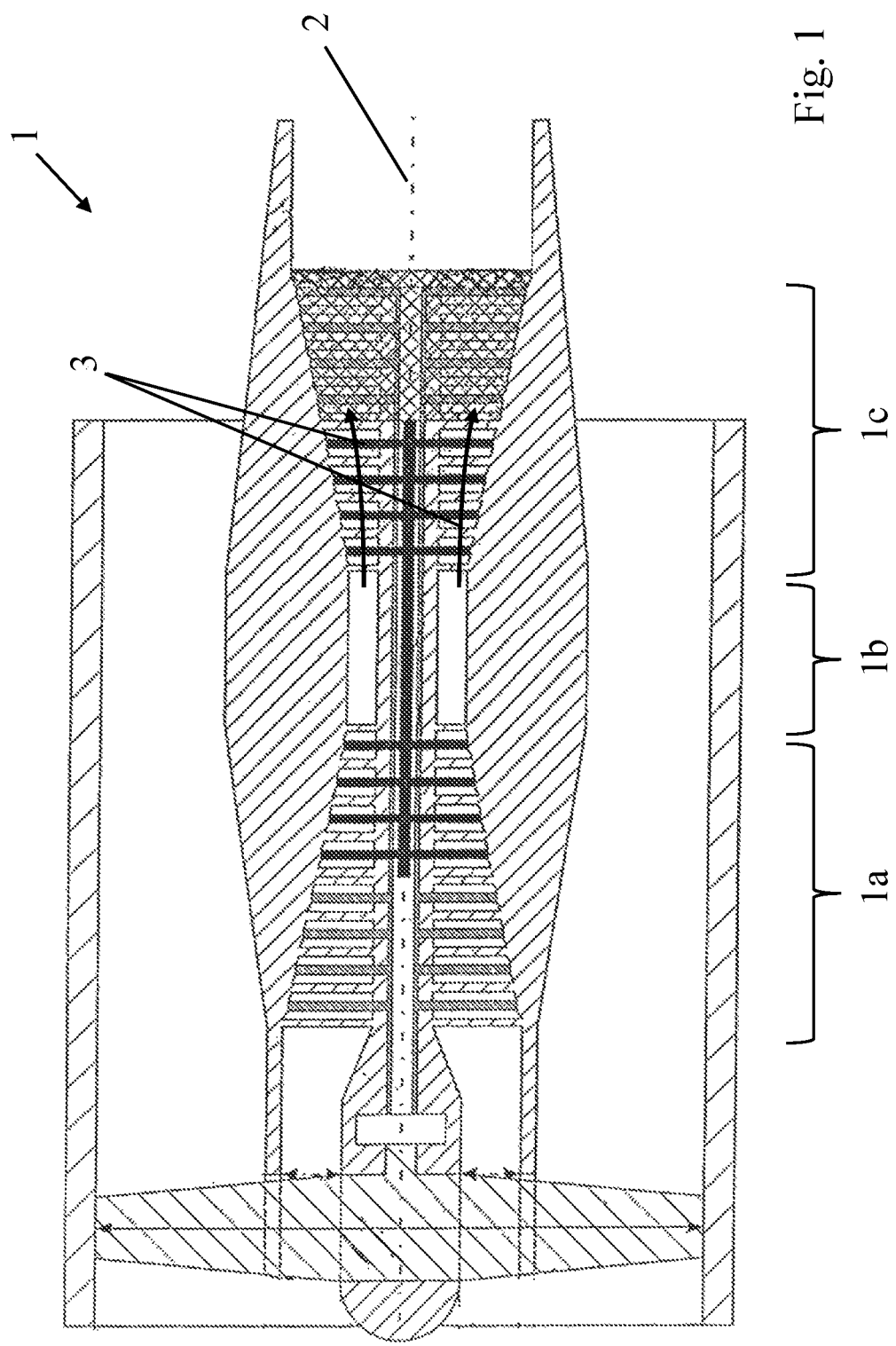
FIG. 1 shows a jet engine in an axial section.

FIG. 1 shows a turbomachine 1, concretely a turbofan engine, in an axial section. Functionally, the turbomachine 1 is divided into compressor 1A, combustion chamber 1B, and turbine 1C. Both the compressor 1A as well as the turbine 1C are each constructed of a plurality of stages; each stage is composed of a guide vane ring and a rotating blade ring following thereon. The rotating blade rings rotate around the longitudinal axis 2 of the turbomachine 1 during operation. Aspirated air is compressed in the compressor 1A and is then burned in the downstream combustion chamber 1B with kerosene mixed in. The hot gas flows through the hot-gas channel 3 and in this way propels the rotating blade rings, which rotate around the axis of rotation 2.

Figure 2:
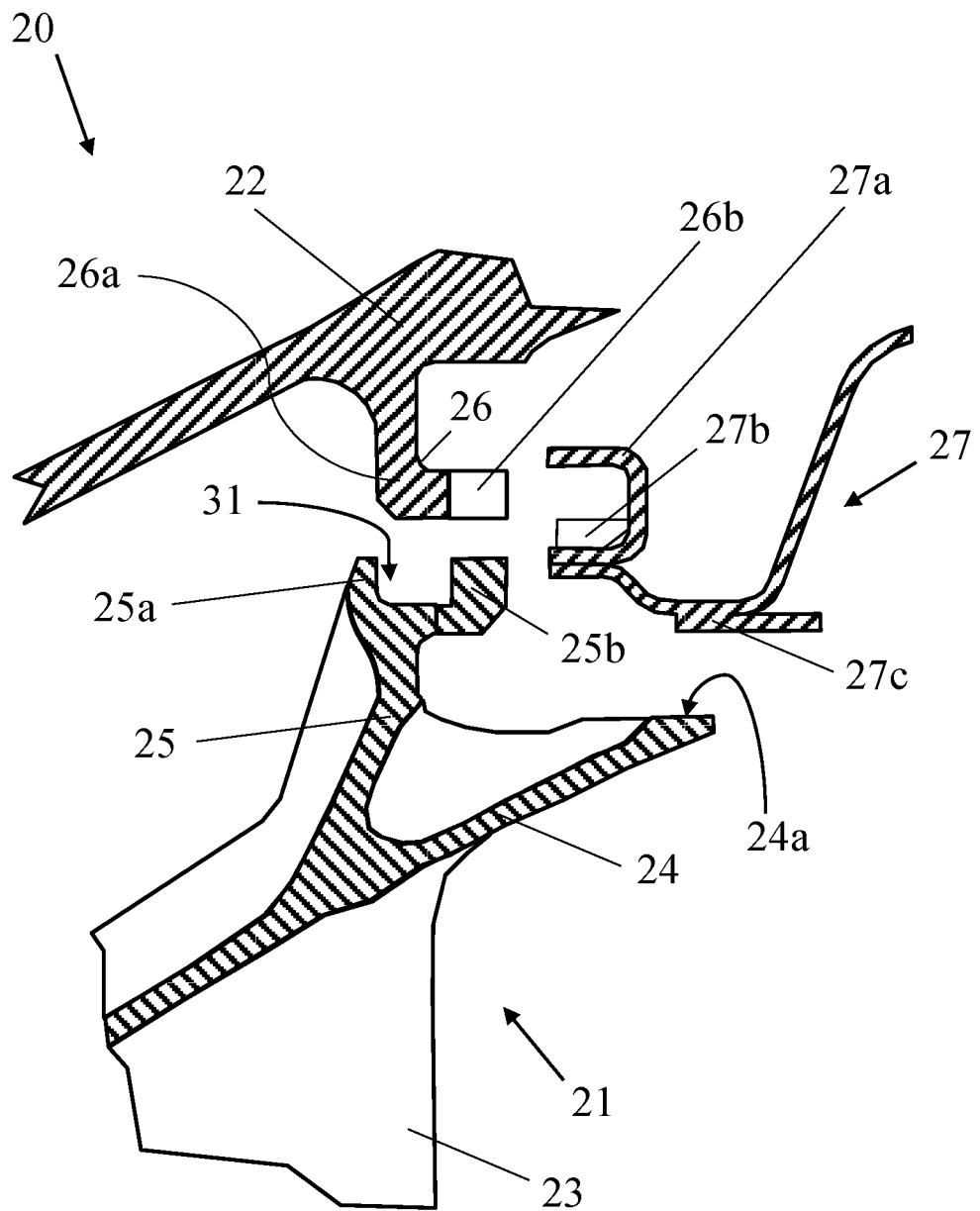
FIG. 2 shows the parts of a guide vane arrangement according to the invention in a partially sectioned lateral view, and taken prior to assembling.

FIG. 2 shows a guide vane arrangement 20 according to the invention in an as yet unassembled state, and, in fact, in an axial section (sectioned lateral view). The guide vane arrangement 20 has a guide vane segment 21 as well as a housing part 22, of which an excerpt is shown for each of these. Concretely, in the case of the guide vane segment 21, a part of the guide vane 23 as well as the outer shroud 24 arranged radially outside the latter can be recognized. A back guide vane hook 25 is arranged at the outer shroud 24, this hook engaging with a housing hook 26 of the housing part 22, in one another in form-fitting manner. Further, there is a securing element 27 that serves for the radial securing and at the same time for sealing (see below in detail).

Figure 3:
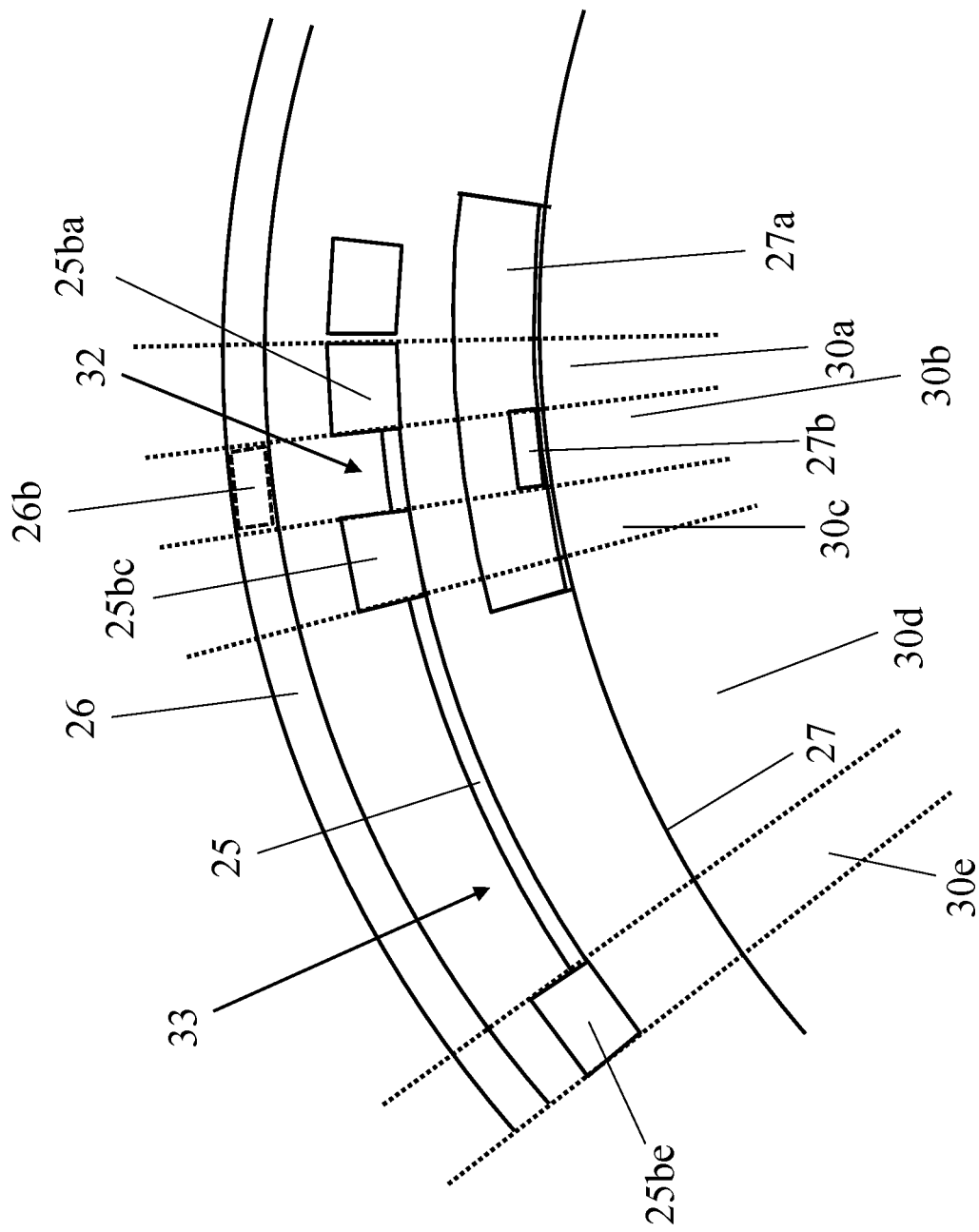
FIG. 3 shows an axial view relating to FIG. 2.
Figure 4:
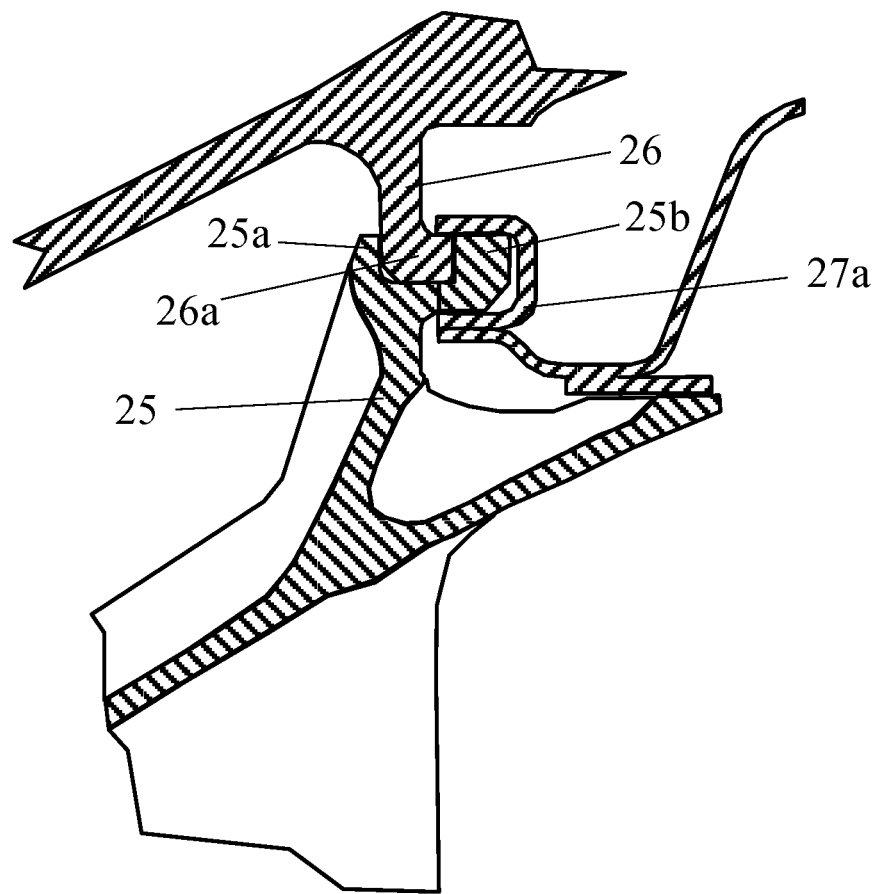
FIG. 4 shows the parts according to FIG. 2 in the assembled state.

In the following, refer additionally to FIG. 3, which shows the parts of the guide vane hook 25, the housing hook 26, as well as the securing element 27, engaging in one another. Further, refer to FIG. 4, which shows the assembled state. In a first peripheral segment 30A, a front wall 25A and a back wall 25B of the guide vane hook 25 form a groove 31 open radially toward the outside. In FIG. 3, the plane of observation lies in this groove and the view falls on the back wall 25B. A ring section 26A of the housing hook 26 is held axially in the groove 31.

In a second peripheral segment 30 B, the back wall 25B is interrupted. The housing hook 26 engages in this discontinuity 32 with a cam 26B projecting axially toward the back at the ring section 26A. The position thereof is indicated by the dashes in FIG. 3 (the cam 26B extends behind the plane of the drawing). In a third peripheral segment 30C, the back wall 25B is present again, so that the cam 26B and thus the housing part 22 are peripherally secured.

In this respect, an axial securing and a peripheral securing are realized at the same time with the arrangement according to the invention, and this is carried out, in fact, without separate pins or securing rings, etc. Refer expressly to the introduction to the description with respect to the advantages thereof.

In a fourth peripheral segment 30D, the back wall 25B again has a discontinuity, wherein a cam is not arranged in this additional discontinuity 33. Instead, it serves for mechanical unloading with respect to mechanical stresses produced by temperature gradients; see the introduction to the description for individual details. In a fifth peripheral segment 30E, the back wall 25B is present again; the wall regions 25BA and 25BE secure the guide vane segment 21 against a rotation around the vertical axis.

The securing element 27 forms a U-shape open toward the front with a section 27A, and when in the assembled state, this U-shape engages and holds together radially the guide vane hook 25 (in particular, the back wall 25B) and the housing hook 26 (the ring section 26A and the cam 26B). The securing element 27 further has a cam 27B, which is arranged in the discontinuity 32 in the second peripheral segment 30B and creates a peripheral securing.

Further, the securing element 27 has a sealing section 27C that is applied at an outer surface 24A of the outer shroud 24, bounding the back edge thereof, and creating a shield relative to the hot-gas channel.

What is claimed is:

1. A guide-vane arrangement for a turbomachine, comprising
a guide vane segment and a housing that are fastened to one another, for which a back guide vane hook that rises radially toward the outside from an outer shroud of the guide vane segment, referred to a longitudinal axis of the turbomachine, and a housing hook extending from the housing, which is arranged radially inside circumferentially at the housing, engage in one another in a form-fitting manner,
wherein, in a first peripheral segment of the guide vane arrangement, the guide vane hook has a front wall and a back wall, and therewith forms a groove open radially toward the outside, in which a ring section of the housing hook is arranged and held axially, and
wherein, in a second peripheral segment of the guide vane arrangement, the back wall of the guide vane hook is provided with a discontinuity, and a cam projecting axially toward the back is arranged at the ring section of the housing hook,
the cam extending axially toward the back in the discontinuity of the back wall and is held therein for circumferentially fixing in place,
wherein, in a third peripheral segment of the guide vane arrangement, which follows the second peripheral segment having the discontinuity, the front wall, together with the back wall, again forms a groove open radially toward the outside, in which the ring section of the housing hook is arranged and is held axially,
wherein, in a fourth peripheral segment of the guide vane arrangement, which follows the third peripheral segment, the back wall of the guide vane hook is provided with an additional discontinuity, and
wherein the additional discontinuity is devoid of the housing hook and no additional cam of the housing hook is arranged therein.

2. The guide vane arrangement according to claim 1 wherein, in a fifth peripheral segment of the guide vane arrangement, which follows the fourth peripheral segment having the additional discontinuity, the front wall, together with the back wall, again forms a groove open radially toward the outside, in which the ring section of the housing hook is arranged and held axially.

3. The guide vane arrangement according to claim 2, wherein the fifth peripheral segment bounds one end of the outer shroud on a circumferential side.

4. The guide vane arrangement according to claim 1, wherein the first peripheral segment bounds one end of the outer shroud on a circumferential side.

5. The guide vane arrangement according to claim 1, wherein the front wall of the guide vane hook extends continually without discontinuity from one end of the guide vane segment on a circumferential side to the opposite end on the circumferential side.

6. The guide vane arrangement according to claim 1, further comprising a securing element, which, when observed in an axial section, forms a U-shape open toward the front, which encloses the guide vane hook and the housing hook, at least in segments.

7. The guide vane arrangement according to claim 6, wherein, when observed in an axial section in the first peripheral segment the housing hook with the ring section forms an L-shape with a leg oriented toward the back, which is enclosed radially toward the outside by the securing element.

8. The guide vane arrangement according to claim 6 wherein the securing element has a sealing section, which is applied at an outer surface of the outer shroud of the guide vane segment this sealing section pointing radially toward the outside, and/or in which the securing element forms a gas channel boundary, which radially bounds rotating blades adjacent to the guide vane segment.

9. The guide vane arrangement according to claim 8, wherein the sealing section of the securing element is applied also in a region of the outer surface of the outer shroud, which bounds the back edge of the outer shroud.

10. The guide vane arrangement according to claim 1, wherein the guide vane arrangement is configured and arranged in a turbine module.

11. The guide vane arrangement according to claim 1, wherein the guide vane arrangement is configured and arranged in a jet engine.

12. A guide-vane arrangement for a turbomachine, comprising
a guide vane segment and a housing that are fastened to one another, for which a back guide vane hook that rises radially toward the outside from an outer shroud of the guide vane segment, referred to a longitudinal axis of the turbomachine, and a housing hook extending from the housing, which is arranged radially inside circumferentially at the housing, engage in one another in a form-fitting manner;
wherein, in a first peripheral segment of the guide vane arrangement, the guide vane hook has a front wall and a back wall, and therewith forms a groove open radially toward the outside, in which a ring section of the housing hook is arranged and held axially,
wherein, in a second peripheral segment of the guide vane arrangement, the back wall of the guide vane hook is provided with a discontinuity, and a cam projecting axially toward the back is arranged at the ring section of the housing hook,
the cam extending axially toward the back in the discontinuity of the back wall and is held therein for circumferentially fixing in place,
wherein, a securing element, which, when observed in an axial section, forms a U-shape open toward the front, which encloses the guide vane hook and the housing hook, at least in segments, and
wherein a cam projecting axially toward the front is provided at the securing element in the second peripheral segment of the guide vane arrangement, the cam being arranged together with the cam of the housing hook in the discontinuity of the back wall of the guide vane hook.

* * * * *